Nov. 29, 1932.  E. F. W. ALEXANDERSON  1,889,587

TELEVISION RECEIVER

Filed Sept. 19, 1931

Inventor:
Ernst F. W. Alexanderson,
by Charles E. Mullen
His Attorney.

Patented Nov. 29, 1932

1,889,587

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

TELEVISION RECEIVER

Application filed September 19, 1931. Serial No. 563,825.

My invention relates to television apparatus and particularly to that part of such apparatus by which the transmitted image is received. An object of my invention is the provision of improved apparatus of this character having a plurality of light control elements whose combined effects produce a single image of greater brilliancy.

My invention will be better understood from the following description taken in connection with the accompanying drawing, and its scope will be pointed out in the appended claims.

Figure 1:
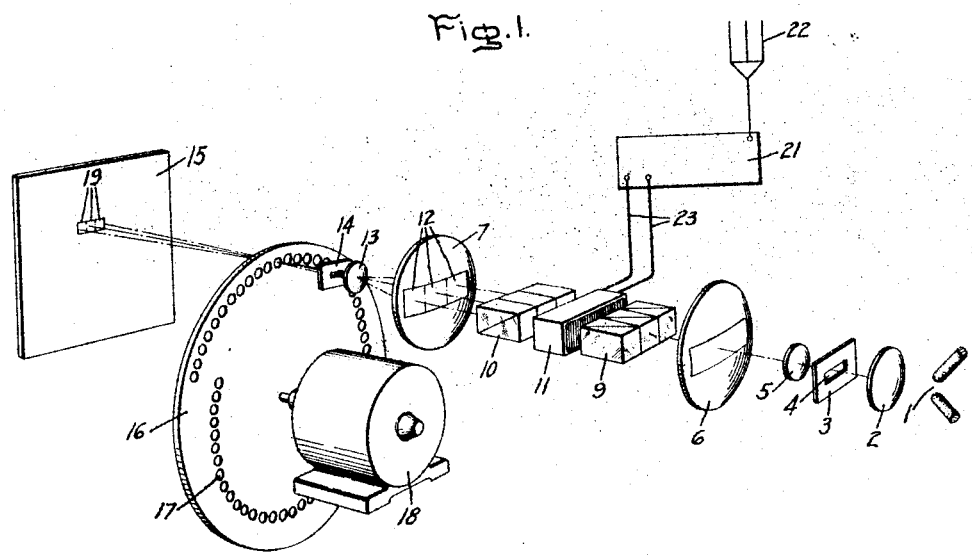
Figure 2:
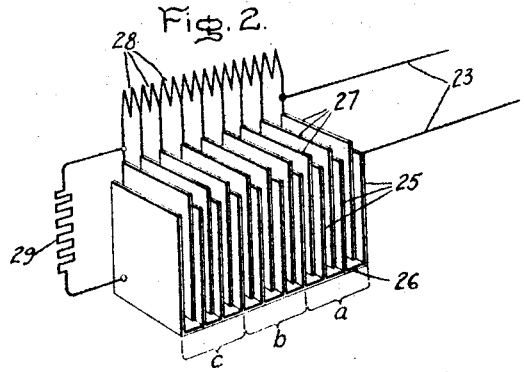

Referring to the drawing, Fig. 1 is a perspective view of apparatus embodying my invention; Fig. 2 is a detail view of the special Kerr cell apparatus drawn to a larger scale and forming a part of the apparatus illustrated by Fig. 1.

In the drawing I have illustrated the main light source 1 as an arc lamp, the light from which is concentrated by the condensing lens 2 on the diaphragm 3 having therein the rectangular aperture 4. Light from this aperture passes through lens 5 to lens 6 by means of which it is caused to extend in substantially parallel rays to lens 7. Between lens 6 and 7 are arranged a plurality of polarizing prisms 9 and analyzing prisms 10, the same being arranged side by side and between the polarizing and analyzing prisms is the Kerr cell apparatus 11. Any desired number of prisms 9 and 10 may be employed, but for convenience in illustrating and describing my invention I have chosen to show three each of these prisms, the light passing through each pair of prisms and the intermediate Kerr cell forming a separate light square 12 on lens 7. Light forming these squares is concentrated by lens 7 and by an additional lens 13 on a rectangular opening in diaphragm 14. Between the diaphragm 14 and the screen 15 upon which the received image is produced is the rotatable scanning disk 16 having a spiral row of lenses 17 and driven by the synchronous motor 18, it being understood that the motor 18, by means not shown, is caused to operate in synchronism with a corresponding element at the sending station. As the disk 16 rotates, each successive lens thereof produces a magnified image of the rectangular opening in diaphragm 14 on the screen 15 in a manner well understood in this form of television apparatus. The image 19 formed on the screen comprises the three light squares corresponding to the three squares 12. The received signal for operating the Kerr cell apparatus may be transmitted by wire, radio, or in any other desired manner. In the drawing, I have illustrated, by way of example, a radio receiver 21 having an antenna 22 and the connections 23 with the Kerr cell apparatus 11.

If with the above described arrangement the Kerr cell apparatus 11 is affected simultaneously throughout its length, it will be seen that each of the three light squares 19 will produce the same picture on the screen, but the three resulting pictures will be displaced relative to each other distances corresponding to the relative positions of the light squares. I shall now describe the means which I have provided for causing these three pictures to coincide with one another thereby producing a single picture having correspondingly increased brilliancy.

Referring to Fig. 2, which illustrates the Kerr cell device 11 in detail and to a larger scale, it will be seen that all of the plates 25 of one polarity, for example all the negative plates, are connected together at 26. The plates 27 of the other set, for example all of the positive plates, are connected each with the next through inductances 28, the first plate of each positive and negative series being connected with the leads 23. Between the last plates of the two series is the resistance 29. Inasmuch as the plates of the Kerr cell have a relatively high capacitance, this arrangement of inductances 28 is analogous to a transmission line having a surge impedance at the end thereof. The energy delivered by the radio receiver 21 will energize one plate 27 after another finally reaching the resistance 29 where the energy pulse is absorbed. Since I have shown three pairs of prisms 9 and 10 for producing the three light squares 19 on the screen, the plates of the complete Kerr cell may be considered as comprising the three groups indicated by the letters a, b and c, each group affecting the light passing through a pair of prisms 9 and 10. For convenience, each group may be considered as a separate cell. If it be assumed, for example, in a 48 line picture, that the time for a picture element to travel a distance equal to its own width is 1/40,000th of a second, the value of the inductance 28 which with the distributed capacity of the plates in effect form a transmission line will be such that the electric pulse will travel along the cell in 3/40,000th of a second. Inasmuch as the highest modulation frequency used in such a picture is 20,000 cycles per second, it follows that the transmission line so formed should have a length of 1½ wave lengths for this frequency. Such artificial transmission line may be made up of block sections, each block being ⅙ of a wave length. As illustrated, I have shown the transmission line made up out of nine blocks corresponding to the nine positive plates 27, there being eight inductances 28 connecting these plates, each inductance having, for example, 5000 ohms impedance at 20,000 cycles. Absorbing resistance at the end of the line may have a value, for example, of 5000 ohms.

By means of the above described apparatus it will be seen that each received pulse travels along the Kerr cell apparatus at a speed which is so related to the movement of the image on the screen due to the rotation of the scanning disk that the several light spots 19 will coincide and hence the three separate pictures will coincide producing a single picture of correspondingly increased brilliancy. While I have shown three pairs of prisms 9 and 10, it will be understood that if desired a greater number of pairs of prisms may be used; likewise various other means may be employed for causing the received electric pulse to successively actuate the groups of plates constituting the complete Kerr cell.

I have chosen the particular embodiment described above as illustrative of my invention and it will be apparent that various other modifications may be made without departing from the spirit and scope of my invention, which modifications I am to cover by the appended claims.

What I claim as new and desire to secure by Letters Patent of the United States, is:

1. A television receiver comprising a light source, a receiving member, means for simultaneously scanning the member with a plurality of light beams from said source, comprising Kerr cells for controlling all of said beams by the same received signal, and means for causing a delay in the response of one of said cells over that of another cell equal to the time interval required for the advance of one spot to the position previously occupied by a spot in the lead thereof.

2. A television receiver comprising a light source, a receiving member, means for scanning the member with light from said source, means including a plurality of Kerr cells in the light path for producing simultaneously a plurality of scanning spots on the member and means for producing a difference in the time response of said Kerr cells corresponding to the time required for a spot to be advanced by the scanning means to the position occupied by a spot in the lead thereof.

3. A television receiver comprising a light source, a receiving member, a plurality of Kerr cells therebetween connected to be actuated by the same received signal, scanning means simultaneously forming a plurality of light spots on said member controlled respectively by said cells, means for supplying a received signal to said cells including a time delay circuit constructed to delay the signal received by one cell over that received by another cell an amount equal to the time required for the spot controlled by the one cell to reach the position of that controlled by the other cell.

4. A television receiver comprising a light source, a screen, means comprising a plurality of adjacent Kerr cells for controlling a like number of light beams from said source, means for causing said beams simultaneously to scan said screen forming a plurality of advancing spots arranged one after another, a signal receiving circuit, and reactances of various values connecting said circuit with the respective cells to produce a time delay of various amounts in the several beams.

5. A television receiver comprising a light source, a screen, means for controlling a plurality of light beams from said source, optical means including a scanning disk for causing said beams to scan the screen forming thereon separate light spots arranged in a row in the direction of movement thereof, a signal receiving circuit, said controlling means comprising a plurality of Kerr cells having one element of each connected to one side of said circuit, an inductance member connected at one end with the other side of said circuit and having a plurality of taps connected respectively with the other elements of the cells and a resistance connecting the other end of the inductance member with said one side of said circuit.

In witness whereof, I have hereunto set my hand.

ERNST F. W. ALEXANDERSON.